US007490095B2

(12) United States Patent
Labadie et al.

(10) Patent No.: US 7,490,095 B2
(45) Date of Patent: Feb. 10, 2009

(54) SCOPE AND DISTRIBUTION OF KNOWLEDGE IN AN AUTONOMIC COMPUTING SYSTEM

(75) Inventors: Eric Labadie, Toronto (CA); Brent A. Miller, Cary, NC (US); David M. Ogle, Cary, NC (US); John W. Sweitzer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/419,267

(22) Filed: May 19, 2006

(65) Prior Publication Data

US 2007/0271225 A1 Nov. 22, 2007

(51) Int. Cl.
*G06F 7/00* (2006.01)
*G06F 17/00* (2006.01)
*G06F 17/30* (2006.01)

(52) U.S. Cl. .............................. 707/100; 707/3; 707/10; 707/104.1

(58) Field of Classification Search ..................... 707/3, 707/10, 104.1
See application file for complete search history.

(56) References Cited

U.S. PATENT DOCUMENTS

| 5,398,304 A * | 3/1995 | Bauman et al. ................ 706/49 |
| 2004/0059966 A1 | 3/2004 | Chan et al. |
| 2004/0060054 A1 | 3/2004 | Das et al. |
| 2004/0103173 A1 | 5/2004 | Donatelli et al. |
| 2005/0060391 A1 | 3/2005 | Kaminsky et al. |
| 2005/0091352 A1 | 4/2005 | Alex et al. |
| 2005/0097146 A1 | 5/2005 | Konstantinou et al. |
| 2006/0253495 A1 * | 11/2006 | Png ............................. 707/200 |

OTHER PUBLICATIONS

"An architectural blueprint for autonomic computing", IBM and autonomic computing Apr. 2003, (retrieved on Jun. 22, 2005), Internet <URL:http://www-03.ibm.com/autonomic/pdfs/ACwpFinal.pdf>.
"An autonomic computing roadmap", Nicholas Chase, (retrieved on Jun. 22, 2005), <URL:http://www-106.ibm.com/developworks/library/ac-roadmap/>.
"Design and Evolution of Autonomic Computing Systems", Hausi A. Muller, Universit Victoria, (retrieved on Jun. 22, 2005), <URL:http://www.engr.uvic.ca/~seng420/lectures/420-F04-auto-col.pdf>.
"Autonomic Computing: IBM's perspective on the state of Information Technology", <URL:http://www-1.ibm.com/industries/government/doc/content/bin/auto.pdf>.
"ISRC Future Technology Topic Brief Autonomic Computing", Siew Fan Wong, Baue College of Business, University of Houston, (retrieved on Jun. 22, 2005), <URL: http://www.uhisrc.com/FTB/Autonomic/AutonComp.pdf>.
"The role of ontologies in autonomic computing systems", Stojanovic et al., IBM Systems Journal vol. 43, No. 3 p. 598-616, 2004 USA.

* cited by examiner

*Primary Examiner*—Etienne P LeRoux
*Assistant Examiner*—Jorge A Casanova
(74) *Attorney, Agent, or Firm*—Charles L. Moore; Moore & Van Allen, PLLC

(57) ABSTRACT

An autonomic computing system may include an autonomic manager and a knowledge source accessible by the autonomic manager and any other entities associated with the autonomic computing system. The knowledge source may include a service interface adapted for the autonomic manager to access the knowledge source. The knowledge source may also include a multiplicity of knowledge elements.

12 Claims, 5 Drawing Sheets

SCOPE AND DISTRIBUTION OF KNOWLEDGE IN AN AUTONOMIC COMPUTING SYSTEM

BACKGROUND OF THE INVENTION

The present invention relates to autonomic computing or the like, and more particularly to a method and system to manage scope and distribution of knowledge in an autonomic computing system.

Autonomic computing technology is based on creating system components referred to as autonomic managers that can perform actions that make systems more self-managing. An autonomic manager may perform a closed autonomic computing loop, such as a monitor-analyze-plan-execute (MAPE) loop or the like. Accordingly, the autonomic computing loop may involve the operations of monitoring a manageable entity, analyzing any data or information received, planning any actions as a result of the analysis and executing the actions. An autonomic manager's ability to govern and modify its behavior and carry out the autonomic computing loop may depend upon the autonomic manager's know-how or knowledge, that is, what the autonomic manager knows how to do and how this know-how or knowledge may be extended during development, initialization and steady-state operation of the autonomic manager.

BRIEF SUMMARY OF THE INVENTION

In accordance with an embodiment of the present invention, an autonomic computing system may include an autonomic manager and a knowledge source accessible by the autonomic manager and any other entities associated with the autonomic computing system. The knowledge source may include a service interface adapted for the autonomic manager to access the knowledge source. The knowledge source may also include a multiplicity of knowledge elements.

In accordance with another embodiment of the present invention, a knowledge source may include a multiplicity of knowledge elements. The knowledge source may also include at least one interface to access the knowledge source by at least one of an autonomic manager, a managing entity of the autonomic manager, and an external source or entity for tooling and knowledge creation relative to the knowledge source. In one embodiment of the present invention the external source or entity may be a developer, administrator or others.

In accordance with another embodiment of the present invention, a method to manage knowledge in an autonomic computing system may include allowing knowledge to be loaded from a knowledge source to an autonomic manager and allowing knowledge to be loaded on the knowledge source. The method may also include allowing management of knowledge loaded on the knowledge source and allowing the knowledge source to be queried to determine types of knowledge loaded on the knowledge source.

In accordance with another embodiment of the present invention, a computer program product to manage knowledge in an autonomic computing system may include a computer usable medium having computer usable program code embodied therein. The computer usable medium may include computer usable program code configured to at least one of: allow specific knowledge to be loaded from a knowledge source to an autonomic manager; allow specific knowledge to be loaded to the knowledge source; allow the autonomic manager to subscribe to particular knowledge publishable by the knowledge source; allow the autonomic manager to unsubscribe from receiving particular knowledge publishable by the knowledge source; and allow selected knowledge to be loaded from the knowledge source to the autonomic manager as instructed by a manager of the autonomic manager.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
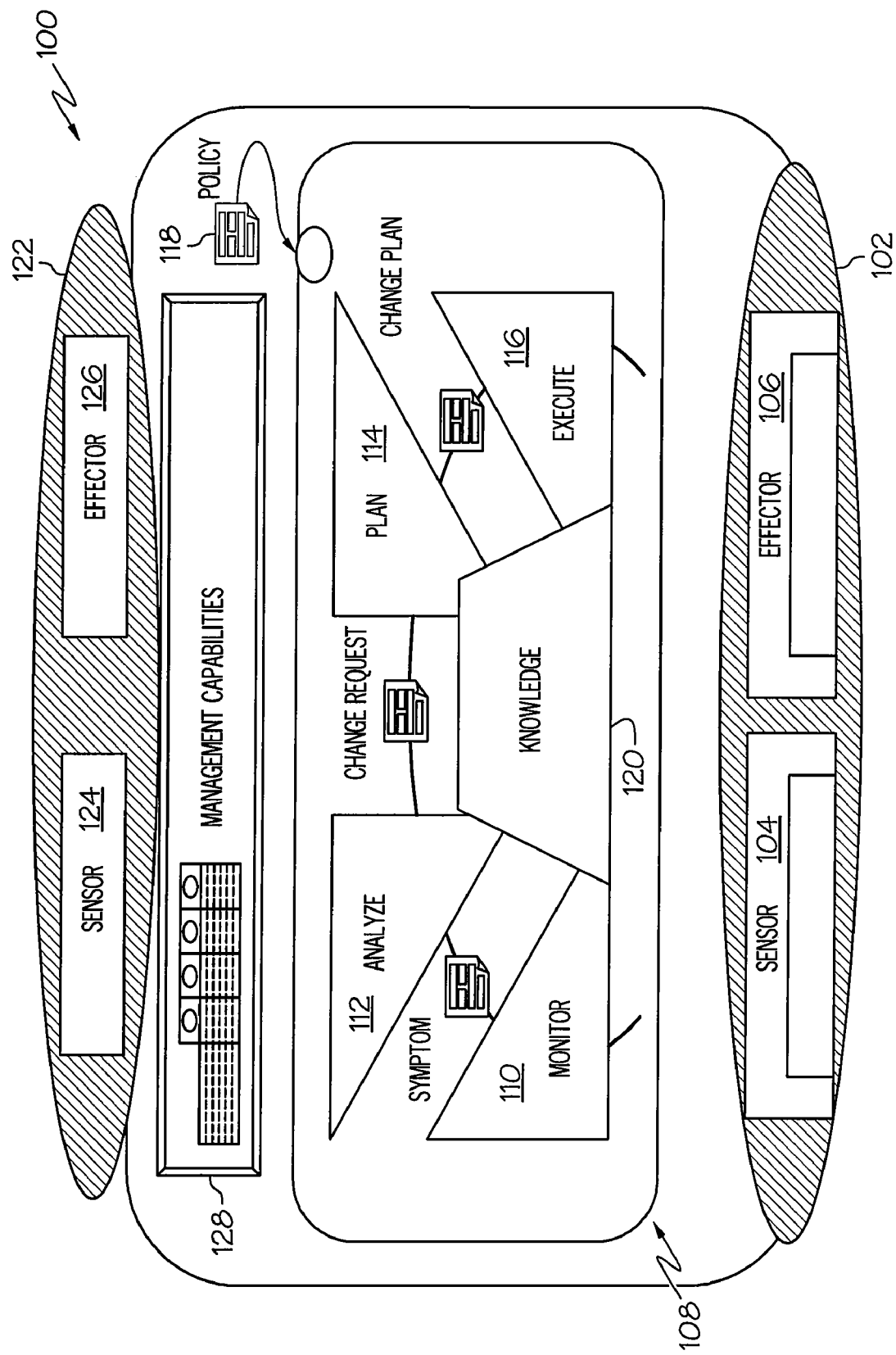
FIG. 1 is a block diagram of an exemplary autonomic manager in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary autonomic manager 100 in accordance with an embodiment of the present invention. An example of an autonomic manager will be described briefly herein for understanding of the invention. Autonomic computing and autonomic managers are described in more detail in "An Architectural Blueprint for Autonomic Computing" Third Edition, June 2005, available from the IBM Corporation. The autonomic manager 100 may include a manager interface 102 through which the autonomic manager may manage a resource or other manageable entity or component. The manager interface 102 may include a sensor interface 104 and an effector interface 106. The sensor interface 104 and effector interface 106 may monitor and control the managed entity.

The autonomic manager 100 may also include an autonomic computing loop 108, MAPE loop or process. The autonomic computing loop 108 may include a monitor function or module 110, an analyze function or module 112, a plan function or module 114 and an execute function or module 116.

The monitor function 110 may provide mechanisms that collect, aggregate, filter, correlate and report details, such as metrics, topologies or the like collected from a manageable entity or resource.

The analyze function 112 may provide mechanisms that model complex situations, for example, time-series forecasting, queuing models or other models of situations. The analyze function may use policy information 118 as a guide. These analyze mechanisms allow the autonomic manager 100 to learn about the environment and help predict future situations.

The plan function 114 may provide mechanisms that construct the actions needed to achieve goals and objectives. The execute function 116 may provide the mechanisms that control the execution of a plan, which may involve executing operations on a managed entity or resource. These four parts 110-116 work together to provide the control loop functionality. The four parts 110-116 communicate and collaborate with one another and exchange appropriate knowledge and data. The four parts may store and acquire knowledge or data from a knowledge base 120.

The autonomic manager 100 may also include a manageability interface or interfaces 122. The manageability interface 122 may include a sensor interface 124 and an effector interface 126. The sensor interface 124 and effector interface 126 may be substantially the same as the sensor and effector interfaces on a managed resource. The manageability interface 122 may permit other autonomic managers and other components in a system or distributed infrastructure to use the autonomic manager 100.

The autonomic manager 100 may also include a manageability capabilities function or module 128. The manageability capabilities 128 may refer to a logical collection of manageable resource state information and operations. Examples of manageability capabilities 128 may include: identification—state information and operations used to identify an instance of a manageable resource; metrics—state information and operations for measurements of a manageable resource, such as throughput, utilization and so on; configuration—state information and operations for the configurable attributes of a manageable resource; and similar capabilities. The manageability capabilities function 128 is linked to the sensor and effector interfaces 124 and 126. For each manageability capability 128, a client of the manageability interface 122 may be able to obtain and control state data through the manageability interface 122, including: meta details (for example, to identify properties that are used for configuration of a manageable resource, or information that specifies which resources can be hosted by the manageable resource); sensor interactions, including mechanisms for retrieving the current property values (e.g., metrics, configuration) and available notifications (what types of events and situations the manageable resource can generate); or effector interactions, including operations to change the state (which effector operations and interaction styles the manageable resource supports) and call-outs to request changes to an existing state (what types of call-outs the manageable resource can perform).

Figure 2:
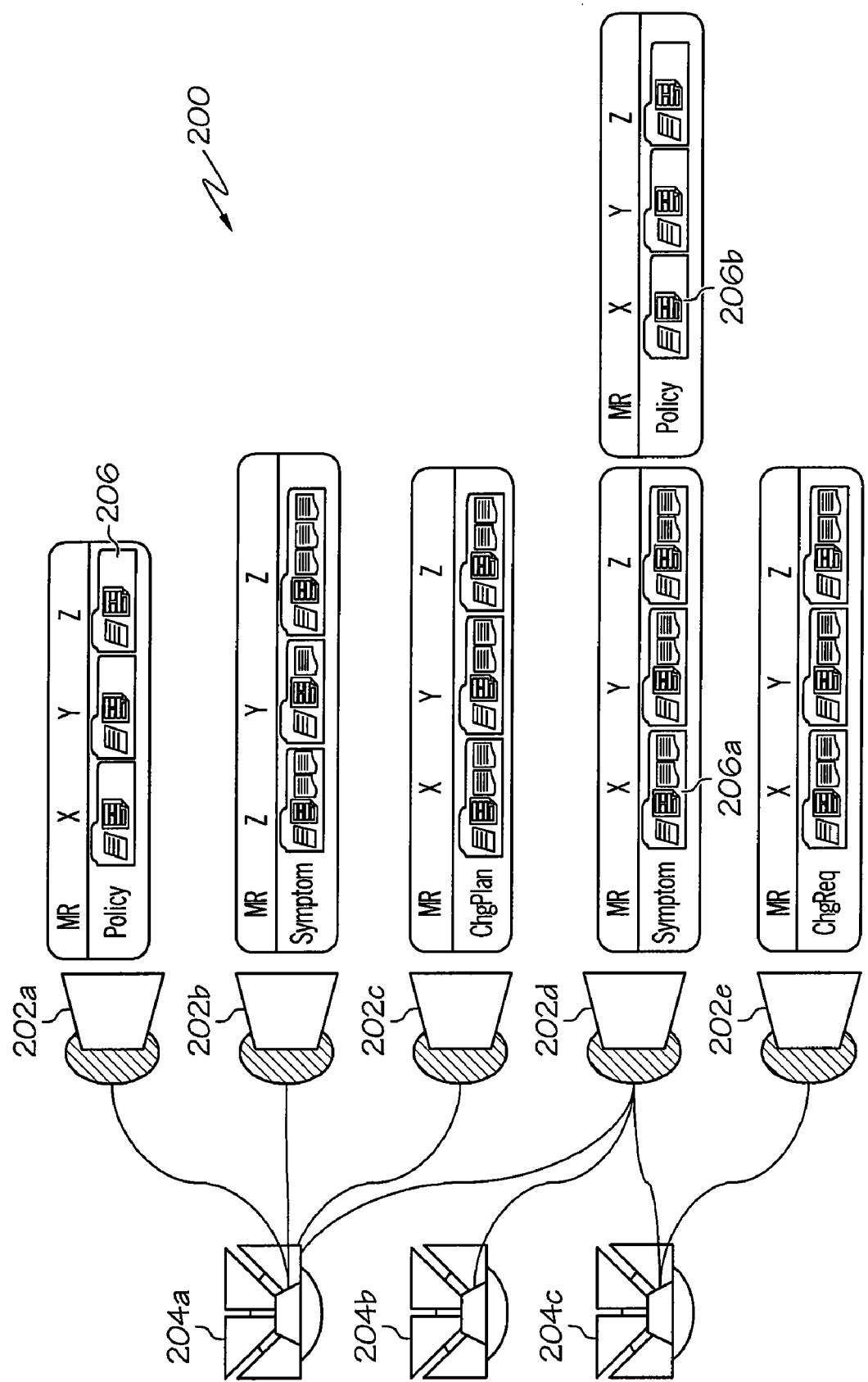
FIG. 2 is a block diagram of an exemplary autonomic computing system including knowledge sources from which managers may upload, download and share knowledge in accordance with an embodiment of the present invention.

FIG. 2 is a block diagram of an exemplary autonomic computing system 200 including knowledge sources 202 from which managers 204 may upload, download and share knowledge in accordance with an embodiment of the present invention. The managers 204 may be autonomic managers, manual managers, a combination thereof or other types of managers or components. Each knowledge sources 202 may be a manageable resource (MR). Each knowledge source 202 may include a plurality of knowledge elements 206. An exemplary structure or architecture for a knowledge element will be described in more detail with reference to FIG. 3.

Each knowledge source 202 may contain a different type of knowledge or may contain knowledge elements 206 that are all of a particular type. Other knowledge sources 202, such as knowledge source 202d, may contain knowledge elements 206a and 206b of multiple different types. Different types or forms of knowledge elements may be used by different types or kinds of autonomic managers 204. Autonomic managers 204 may be categorized by the types of functions or operations they may perform. Some of autonomic managers may only be able to utilize knowledge of a particular type or in a particular form. Examples of the different types of knowledge or knowledge elements 206 may include policy, symptom, change plan and change request, as well as others. Policy knowledge or knowledge elements may relate to policies, rules, protocols or the like for an autonomic manager to follow in performing its autonomic computing loop. Symptom knowledge or knowledge elements may be related to conditions, events or other occurrences within an autonomic computing system that may influence how an autonomic manager is to respond in performing the autonomic computing loop.

Change plan and change request knowledge or knowledge elements may relate to the analysis and plan modules of the autonomic computing loop of an autonomic manager and what the autonomic manager may execute or cause to be executed by any managed resource or entity as a result of a particular symptom that may be monitored or come to the attention of the autonomic manager 204.

Figure 3:
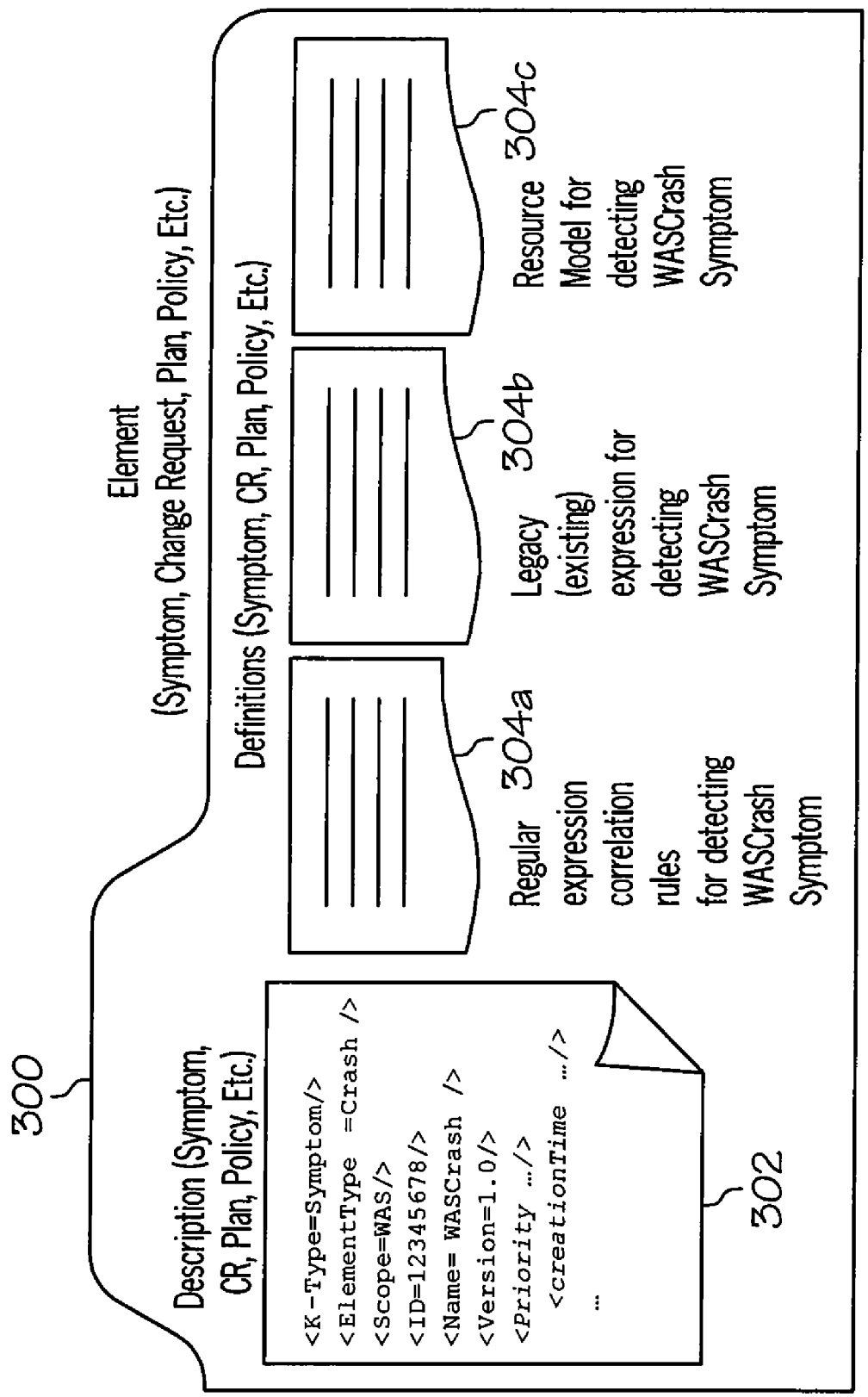
FIG. 3 is a representation of an exemplary architecture of a knowledge element in accordance with an embodiment of the present invention.

FIG. 3 is a representation of an exemplary architecture of a knowledge element 300 in accordance with an embodiment of the present invention. The knowledge element 300 may be similar to each of the knowledge elements 206 in FIG. 2. As previously discussed the knowledge element 300 may contain different types of knowledge, such as symptom knowledge, change request knowledge, plan knowledge, configuration/topology knowledge, change plan knowledge, policy knowledge or other types of knowledge.

The knowledge element 300 may include a description 302 or facts related to different types of knowledge. The knowledge element 300 may include more than one description 302 that may be in different forms so that the knowledge element 300 may be utilized by different types or kinds of autonomic managers or other managers. An autonomic manager loading the knowledge element 300 may only utilize or be able to utilize the description 302 that is in the form that the manager can interpret. The knowledge description 302 may also specify the scope for which the knowledge element 300 applies in terms of resource type.

The knowledge element 300 may also include one or more definitions 304, rules or the like. The definitions 304 or rules may provide guidance to the manager as to how to best utilize the knowledge described in the description 302 in carrying out its operations. The definitions 304 may also be expressed in multiple forms that may correspond to the different types of knowledge (symptom, change request, change plan, policy, etc.). As an example for a symptom type knowledge element, one definition 304a may be regular expression correlation rules for detecting a particular type symptom described in the description 302. Another definition 304b may be a legacy or existing expression for detecting the particular type symptom. A further definition 304c may be a resource model or the like for detecting the particular symptom. These are exemplary, not exhaustive, forms of rules. Filtering or selection rules, such as XPath rules, as well as numerous other forms of rules, could be used. Typically, only one form of the knowledge definition will be relevant to a particular autonomic manager.

Figure 4A:
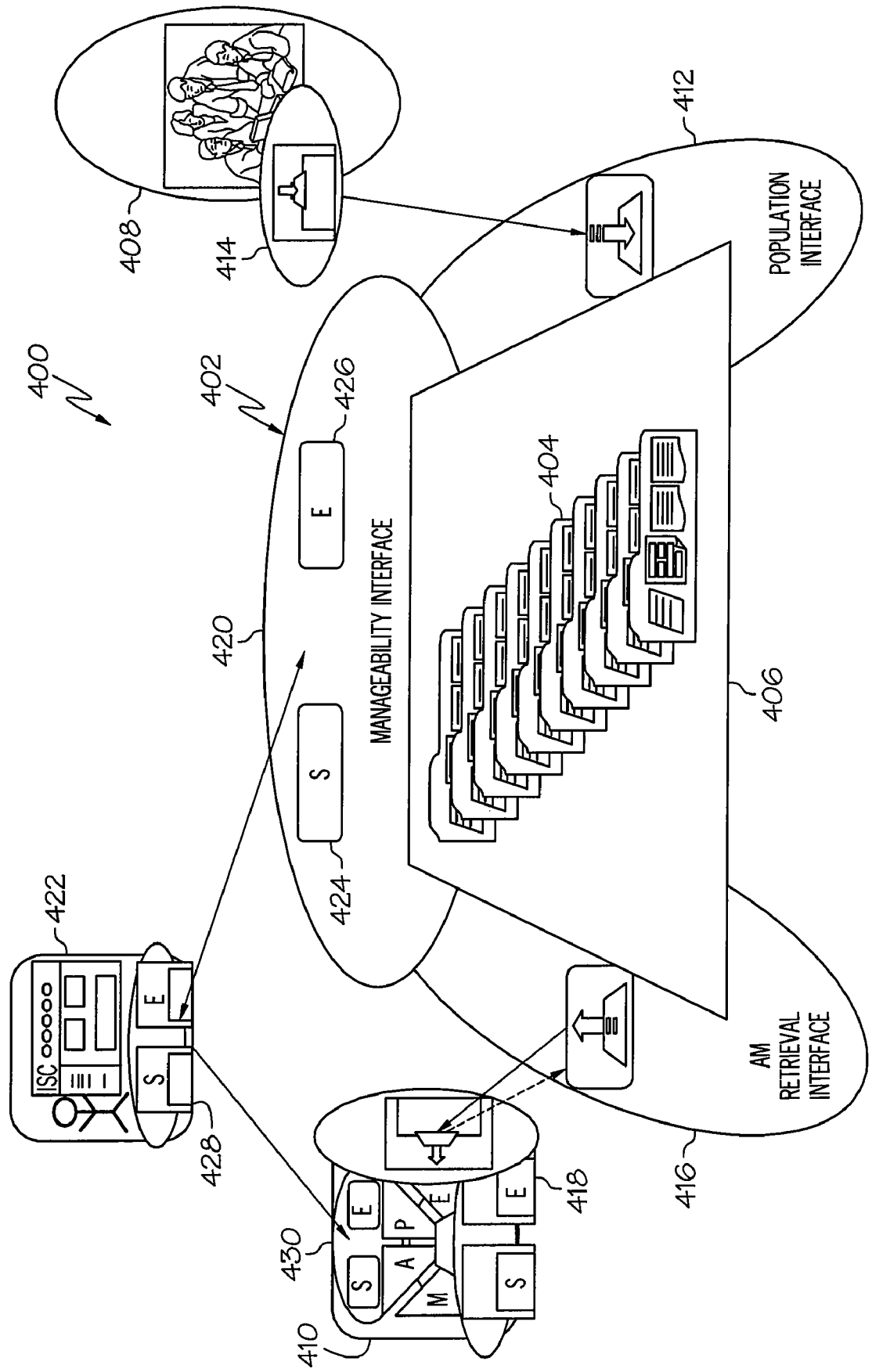
FIG. 4A is a block diagram of an example of an autonomic computing system including an exemplary knowledge source in accordance with an embodiment of the present invention.

FIG. 4A is a block diagram of an example of an autonomic computing system 400 including an exemplary knowledge source 402 in accordance with a further embodiment of the present invention. Similar to that previously discussed, the knowledge source 402 may include a multiplicity of knowledge elements 404. The knowledge elements may be stored in a memory 406 or other repository. Each of the knowledge elements 404 may be similar to the knowledge element 300 of FIG. 3. The knowledge source 402 may be populated by developers 408, administrators or others and is the repository that an autonomic manager 410 or other type manager may use to load new knowledge or to upload knowledge to share with other managers in the system 400.

The knowledge source 402 may include a population interface 412 or the like to interface or interact with the developers 408, administrators or others. A manager interface 414 or the like may be associated with the developers 408 or others to interact with the population interface 412. Examples of functions or operations that may be performed between the developers 408 or others and the knowledge source 402 will be described with reference to FIG. 4B.

The knowledge source 402 may also include an autonomic manager (AM) retrieval interface 416 or the like for interfacing or interacting with an interface 418 of the autonomic manager 410 or other type manager, such as a manual manager. The interface 418 may be a manager interface of the autonomic manager 402 similar to manager interface 102 in FIG. 1. Examples of functions or operations that may be performed between the knowledge source 402 and the autonomic manager 410 via the interfaces 416 and 418 will be described in more detail with reference to FIG. 4B.

The knowledge source 402 may also include a manageability interface 420 to interface or interact with a managing entity, such as a manual manager 422 or other type manager. The manageability interface 420 may include a sensor interface 424 and an effector interface 426 that may be similar to the sensor interface 124 and effector interface 126 of manageability interface 122 in FIG. 1. The manageability interface 420 may interface or interact with a manager interface 428 of the manual manager 422. The manual manager 422 may also interface with the autonomic manager 410 via a manageability interface 430 of the autonomic manager 410. Examples of functions or operations that may be performed between the knowledge source 402 and the manual manager 422 via the interfaces 420 and 424, and examples of functions or operations that may be performed between the manual manager 422 and the autonomic manager 410 will be described in more detail with reference to FIG. 4B.

Figure 4B:
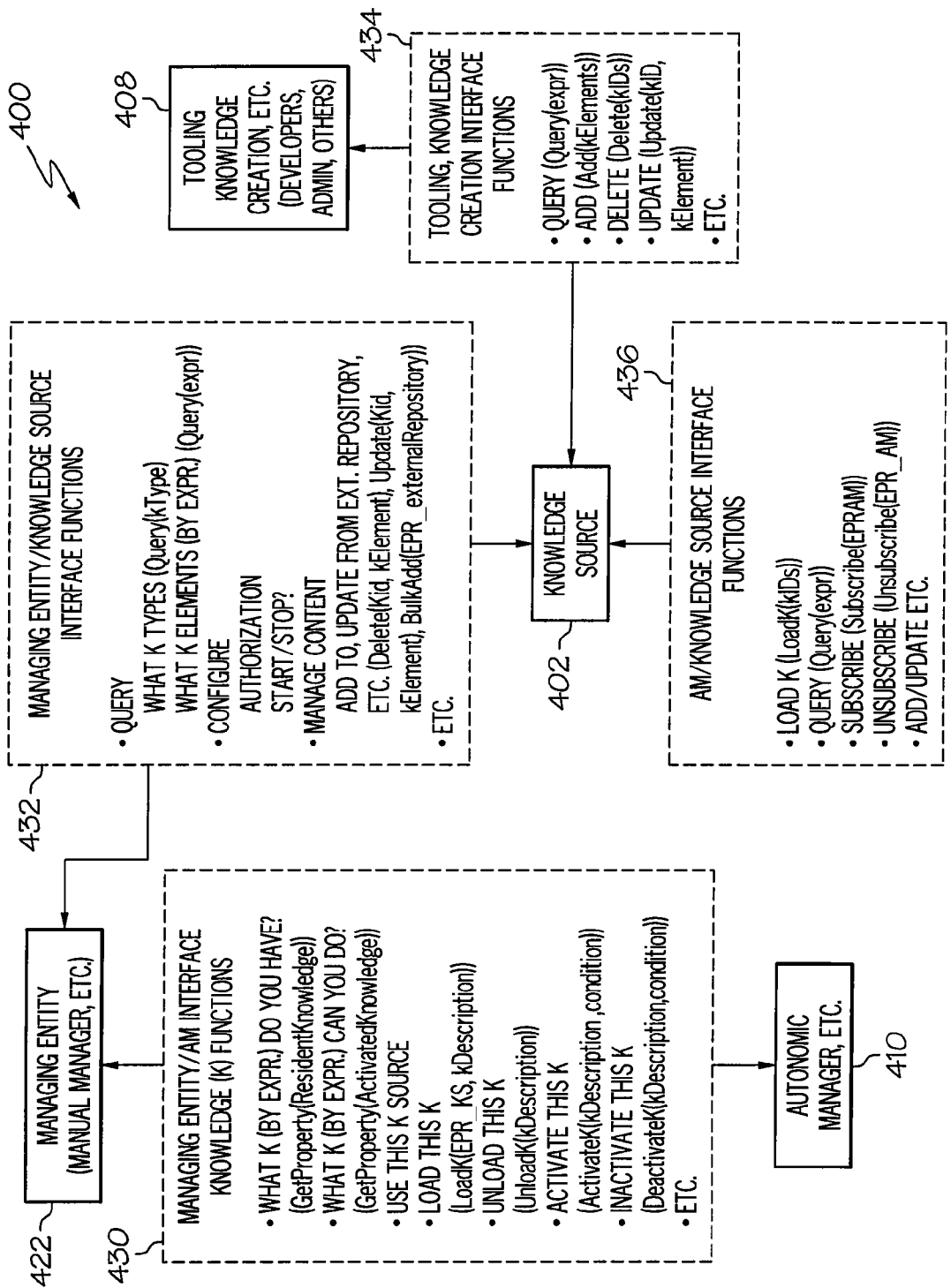
FIG. 4B is a block diagram of the exemplary autonomic computing system of FIG. 4A illustrating examples of different interactions or interface functions between the components of the system in accordance with an embodiment of the present invention.

FIG. 4B is a block diagram of the exemplary autonomic computing system 400 of FIG. 4A illustrating examples of different interactions or interface functions between the components of the system 400 in accordance with an embodiment of the present invention. Block 430 illustrates examples of the types of interface functions or operations that may be performed between the managing entity 422, manual manager or the like and the autonomic manager 410. The examples illustrated are not exhaustive. In block 430, the manager 422 of the autonomic manager 410 may determine the know-how of the autonomic manager 410 using the manageability interface 430 of the autonomic manager 410. The query, "GetPropery (ActivatedKnowledge)" is illustrative of determining the autonomic manager's know-how or knowledge. For example, the manager 422 might ask the autonomic manager 410, "What symptoms can you recognize?" in the form of the interface signature "(GetProperty(Activated Knowledge, Type=Symptom)". The autonomic manager 410 may respond to such a query with knowledge facts from the knowledge element description, similar to the example description 302 described with respect to FIG. 3. The autonomic manager 410 may also specify management capabilities that describe what form of knowledge definitions (rules) it can process, if any.

As illustrated in FIGS. 4A and 4B, the autonomic manager's know-how or knowledge may be extended by loading new relevant knowledge or knowledge elements 404 into the autonomic manager 410 from the knowledge source 402. The managing entity 422 may instruct the autonomic manager 410 to use this particular knowledge source or to load particular or specific knowledge from the knowledge source 402. A command to load particular knowledge may take the form "LoadK(EPR_KS, kDescription)."

Under some circumstances, the managing entity 422 may instruct the autonomic manager 410 to unload or upload particular knowledge to the knowledge source 402 so that the knowledge may be shared by other autonomic managers in the system 400. A command to unload particular or specific knowledge may be "UnloadK(kDescription)." The managing entity 422 may also instruct the autonomic manager 410 to activate particular knowledge or inactivate particular knowledge as illustrated by the commands in block 430.

Block 432 illustrates examples of interface functions between the managing entity 422 and the knowledge source 402. The examples listed are not exhaustive. The functions may include queries as to the types of knowledge or knowledge elements, or may be related to configuration, managing content or the like. Configuration may involve authorizing downloading or uploading specific knowledge or knowledge elements to or from an autonomic manager or other type manager. Configuration may also involve starting and stopping operations based on predetermined parameters or conditions. Managing content may include adding to a knowledge element, updating from an external repository or similar operations.

Block 434 illustrates examples of interface functions between developers 408 or others and is not intended to be a complete list of functions. The functions may include queries, adding elements to the knowledge source 402, deleting knowledge elements from the knowledge source 420, updating knowledge elements and other functions that may occur.

Block 436 illustrated examples of interface functions between the knowledge source 402 and the autonomic manager 410 or other type manager. Examples may include loading selected knowledge or knowledge elements from the knowledge source 402, querying the knowledge source, subscribing to particular knowledge that the knowledge source might publish, unsubscribing from the particular knowledge, adding or updating knowledge or other functions. The manager 422 of the autonomic manager 410 may instruct the knowledge source 402 to load or "push" particular knowledge to the autonomic manager 410, rather than instructing the autonomic manager 410 to load the knowledge. The autonomic manager 410 may also self-load knowledge. In this case, the autonomic manager 410 may make a determination about particular knowledge to load from the knowledge source 402, rather than this determination being made by the manager 422 of the autonomic manager 410. The autonomic manager 410 may then use the "Load K" command or interface to load the relevant knowledge.

As previously described, although the knowledge elements 404 (FIG. 4A) might contain multiple descriptions in multiple forms, the autonomic manager 410 typically will use only one of these forms. Also, the autonomic manager 410 typically can have its know-how extended only within a particular scope.

The system 400 of the present invention thus provides knowledge elements 404 that can be deployed to a knowledge source 402. An author of the knowledge or knowledge elements 404 can specify a scope within which the knowledge or knowledge elements 404 may be applied and may optionally specify multiple definition or rules forms that could apply to different kinds or types of autonomic managers or other managers. The manager 422 of an autonomic manager 410 can query an autonomic manager 410 to determine its know-how capabilities, including the types of knowledge it can process, the scope within which it can apply its know-how, and the form, if any, in which that know-how can be extended. Autonomic managers 410 with the capability to extend their know-how can load new knowledge elements 404 of supported types, consisting of the knowledge description and the relevant knowledge definition(s) to have their know-how extended within the scope of management.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to manage knowledge in an autonomic computing system, comprising:
    allowing knowledge to be loaded from a knowledge source to an autonomic manager, wherein allowing knowledge to be loaded from the knowledge source to the autonomic manager comprises:
        loading policy knowledge related to policies, rules and protocols for the autonomic manager to follow in performing a monitor, analyze, plan, and execute (MAPE) autonomic computing loop of the autonomic manager;
        loading symptom knowledge related to conditions, events and other occurrences within the autonomic computing system influencing how the autonomic manager is to respond in performing the MAPE autonomic computing loop;
        loading change plan and change request knowledge related to analysis and plan modules of the MAPE autonomic computing loop of the autonomic manager and which relate to functions executable by the autonomic manager and the autonomic manager causes to be executed by any managed resource as a result of a particular symptom in the autonomic computing system that is being monitored by the autonomic manager;
    allowing knowledge to be loaded on the knowledge source;
    allowing management of knowledge loaded on the knowledge source; and
    allowing the knowledge source to be queried to determine types of knowledge loaded on the knowledge source.

2. The method of claim 1, further comprising providing a plurality of knowledge elements loaded on the knowledge source, wherein providing each knowledge element comprises:
    providing a knowledge description of each form expected to be utilized by different types of autonomic managers in the autonomic computing system; and
    providing a knowledge definition of each form expected to be utilized by the different types of autonomic managers.

3. The method of claim 2, further comprising:
    allowing addition of another knowledge element;
    allowing deletion of a selected knowledge element; and
    allowing management of a content of each knowledge element.

4. The method of claim 1, further comprising allowing the autonomic manager to be queried to determine the autonomic manager's know how capabilities, including types of knowledge that the autonomic manager can process, a scope within which the knowledge is applicable, and any particular form in which the knowledge is extendable.

5. The method of claim 1, further comprising at least one of:
    allowing a manager of the autonomic manager to instruct the knowledge source to load selected knowledge on the autonomic manager; and
    allowing the autonomic manager to subscribe and unsubscribe to particular knowledge publishable by the knowledge source.

6. The method of claim 1, further comprising providing a plurality of knowledge elements loaded on the knowledge source, wherein providing the plurality of knowledge elements comprises:
    providing a symptom knowledge element related to conditions, events and occurrences within the autonomic computing system influencing how the autonomic manager responds in performing the autonomic MAPE computing loop;
    providing a change request knowledge element related to the analysis and plan modules of the MAPE autonomic computing loop of the autonomic manager;
    providing a plan knowledge element related to operation of the plan module of the MAPE autonomic computing loop;
    providing a configuration/topology knowledge element;
    providing a change plan knowledge element related to operation of the plan module of the MAPE autonomic computing loop; and
    providing a policy knowledge element related to policies, rules and protocols for the autonomic manager to follow in performing the MAPE autonomic computing loop.

7. The method of claim 1, further comprising:
    providing an autonomic manager retrieval interface associated with the knowledge source for interacting with an interface of the autonomic manager;
    providing a manageability interface associated with the knowledge source to interact with a manual manager;
    providing a population interface associated with the knowledge source to interact with a developer and administrator.

8. The method of claim 1, further comprising managing the autonomic manager by a manual manager using a managing entity/autonomic manager interface, wherein managing the autonomic manager comprises:
    determining what knowledge the autonomic manager contains;
    instructing the autonomic manager to load certain knowledge from a particular knowledge source;
    instructing the autonomic manager to unload particular knowledge to a designated knowledge source;
    instructing the autonomic manager to activate specific knowledge; and
    instructing the autonomic manager to inactivate selected knowledge.

9. The method of claim 1, further comprising interfacing between a manual manager and the knowledge source, wherein interfacing between the manual manager and the knowledge source comprises:
    querying as to a type of knowledge contained in the knowledge source;
    generating queries related to configuring the autonomic computing system, wherein configuring the autonomic computing system comprises:
        authorizing downloading knowledge from the autonomic manager;
        authorizing uploading knowledge to the autonomic manager;
        starting and stopping operations based on predetermined conditions; and
    managing content by adding knowledge to an external repository.

10. The method of claim 1, further comprising interfacing between a developer/administrator and the autonomic computing system, wherein interfacing between a developer/administrator and the autonomic computing system comprises:
    allowing the knowledge source to be queried;

allowing a knowledge element to be added to the knowledge source;
allowing a knowledge element to be deleted from the knowledge source; and
allowing the knowledge source to be updated.

11. The method of claim 1, further comprising interfacing between the knowledge source and the autonomic manager, wherein interfacing between the knowledge source and the autonomic manager comprises:
   loading selected knowledge from the knowledge source to the autonomic manager;
   querying the knowledge source to determine if the knowledge source contains specific knowledge;
   subscribing to receive particular knowledge that the knowledge source publishes;
   unsubscribing from receiving certain knowledge that the knowledge source publishes; and
   updating selected knowledge.

12. A method to manage knowledge in an autonomic computing system, comprising:
   providing an autonomic manager retrieval interface associated with a knowledge source for interacting between the knowledge source and an interface of an autonomic manager, wherein interacting between the knowledge source and the interface of the autonomic manager comprises:
      loading selected knowledge from the knowledge source to the autonomic manager, wherein loading the selected knowledge comprises loading symptom knowledge related to conditions, events and other occurrences within the autonomic computing system influencing how the autonomic manager is to respond in performing a MAPE autonomic computing loop;
      querying the knowledge source to determine if the knowledge source contains specific knowledge;
      subscribing to receive particular knowledge that the knowledge source publishes;
      unsubscribing from receiving certain knowledge that the knowledge source publishes; and
      updating chosen knowledge;
   providing a managing entity/autonomic manager interface for interacting between the autonomic manager and a managing entity, wherein interacting between the autonomic manager and the managing entity comprises:
      determining what knowledge the autonomic manager contains;
      instructing the autonomic manager to load certain knowledge from a particular knowledge source;
      unloading particular knowledge from the autonomic manager to a designated knowledge source;
      activating specific knowledge on the autonomic manager; and
      inactivating selected knowledge on the autonomic manager;
   providing a manageability interface associated with the knowledge source for interacting between the knowledge source and the managing entity, wherein interacting between the knowledge source and the managing entity comprises:
      querying as to a type of knowledge contained in the knowledge source;
      generating queries related to configuring the autonomic computing system, wherein configuring the autonomic computing system comprises:
         authorizing downloading knowledge from the autonomic manager;
         authorizing uploading knowledge to the autonomic manager;
         starting and stopping operations based on predetermined conditions; and
      managing content by adding knowledge to an external repository; and
   providing a population interface associated with the knowledge source for interacting between a developer/administrator and the autonomic computing system, wherein interacting between the developer/administrator and the autonomic computing system comprises:
      allowing the knowledge source to be queried;
      allowing knowledge elements to be added to the knowledge source;
      allowing knowledge elements to be deleted from the knowledge source; and
      allowing the knowledge source to be updated.

* * * * *